United States Patent
Shigihara et al.

(10) Patent No.: US 7,467,362 B2
(45) Date of Patent: Dec. 16, 2008

(54) FAILURE DETECTION IMPROVEMENT APPARATUS, FAILURE DETECTION IMPROVEMENT PROGRAM, FAILURE DETECTION IMPROVEMENT METHOD

(75) Inventors: Seiji Shigihara, Kawasaki (JP); Hiromichi Makishima, Yokohama (JP); Yasutomo Honma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 11/167,281

(22) Filed: Jun. 28, 2005

(65) Prior Publication Data
US 2006/0236154 A1    Oct. 19, 2006

(30) Foreign Application Priority Data
Mar. 15, 2005    (JP)    ............... 2005-072631

(51) Int. Cl.
*G06F 17/50*    (2006.01)
(52) U.S. Cl. .............. 716/4; 716/2; 716/6; 716/12; 716/18
(58) Field of Classification Search ............... 716/2, 716/3, 12, 18, 4, 6
See application file for complete search history.

(56) References Cited

U.S. PATENT DOCUMENTS 5,812,561 A * 9/1998 Giles et al. ............... 714/726
6,957,403 B2 * 10/2005 Wang et al. ............... 716/3

FOREIGN PATENT DOCUMENTS

| JP | 4-271437 | 9/1992 |
| JP | 2-59967 | 2/1996 |
| JP | 2773148 | 7/1998 |
| JP | 2000-148813 | 5/2000 |

* cited by examiner

*Primary Examiner*—Thuan Do
(74) *Attorney, Agent, or Firm*—Staas & Halsey LLP (57) ABSTRACT

A failure detection improvement apparatus that modifies a net list comprises; a net list input section to which the net list is input; a circuit modification section that adds an observation FF to an appropriate location on the net list; and a net list output section that outputs the net list that has been modified by the circuit modification section.

3 Claims, 7 Drawing Sheets

FAILURE DETECTION IMPROVEMENT APPARATUS, FAILURE DETECTION IMPROVEMENT PROGRAM, FAILURE DETECTION IMPROVEMENT METHOD

BACKGROUND OF THE INVENTION

1. Field of the Invention

The present invention relates to a failure detection improvement apparatus, a medium being readable by a computer and having a failure detection improvement program allowing a computer to execute a failure detection improvement method that modifies a net list recorded thereon, and a failure detection improvement method that improve failure detection rate in circuit verification.

2. Description of the Related Art

In LSI (Large Scale Integrated Circuit) manufacturing process, an ATPG (Automatic Test Pattern Generator) tool is used to automatically generate a test pattern, and the circuit is tested using the test pattern and a verification tool, thereby checking whether there is any failure in a product, and if there is no failure, the product is shipped to market.

As a conventional art related to the present invention, a test facilitation design rule examination apparatus disclosed in Jpn. Pat. Appln. Laid-Open Publication No. 2000-148813 is known, for example. The test facilitation design rule examination apparatus computes the rate of failure detection performed using the ATPG tool in a test facilitation design rule examination to thereby increase design efficiency.

However, the circuit includes a part where the test pattern cannot be generated by the ATPG tool. In the following two types of circuits, the ATPG tool cannot generate the test pattern.

The first circuit is a circuit fixed by a test mode signal. In generating the test pattern using the ATPG tool, some parts in the circuit need to be fixed. A signal value is fixed in the circuit that follows the first circuit, so that it is not possible to detect a failure. For example, in an enable clock buffer called GCKB (Gated Clock Buffer) used for achieving low power consumption in LSI, an enable signal is fixed in a test mode, and the output clock of GCKB is not allowed to be stopped. When a test mode signal flows in, a generation circuit of the enable signal is masked by a mask-cell. Therefore, the ATPG tool cannot generate the test pattern for detecting a failure in the generation circuit. Further, in the case where the test mode signal is used as a select signal and an input terminal having a fixed value in a test mode is selected in a selector, it is impossible to generate a test pattern for detecting a failure in a circuit connected to another input terminal.

The second circuit is a circuit with deep logic, where the number of logic stages provided between FFs (flip-flop) has exceeds the number of logic stages that the ATPG tool can analyze. The ATPG tool sets a value for the front stage FF and observes the value of the rear stage FF, thereby generating a test pattern for verifying logic of the circuit between FFs. However, deep logic makes it difficult to control the value of FF, with the result that the ATPG tool cannot generate a test pattern.

In the case where the ATPG tool cannot generate a test pattern as described above, a user checks a part where the ATPG tool cannot detect a failure with reference to a failure list, which is the execution result of the ATPG tool, and creates a test pattern for that part. However, an increase in the circuit scale of LSI and complexity in the function thereof makes it difficult for the ATPG tool to generate a test pattern, as well as for the user to create a test pattern for the part where a failure cannot be automatically detected. Accordingly, failure detection rate has been decreased.

SUMMARY OF THE INVENTION

The present invention has been made to solve the above problem and an object of the present invention is to provide a failure detection improvement apparatus, a medium being readable by a computer and having a failure detection improvement program allowing a computer to execute a failure detection improvement method that modifies a net list recorded thereon, and a failure detection improvement method that improve failure detection rate by changing a circuit so that the ATPG tool can generate a test pattern.

To solve the above problem, according to a first aspect of the present invention, there is provided a failure detection improvement apparatus that modifies a net list, comprising: a net list input section to which the net list is input; a circuit modification section that adds an observation FF to an appropriate location on the net list; and a net list output section that outputs the net list that has been modified by the circuit modification section.

In the failure detection improvement apparatus according to the present invention, the appropriate location is a circuit whose output value is fixed by a test mode signal.

In the failure detection improvement apparatus according to the present invention, the appropriate location is a circuit in which the number of logic stages exceeds the upper limit of an ATPG tool.

In the failure detection improvement apparatus according to the present invention, the circuit whose output value is fixed by a test mode signal is a circuit for generating an enable signal of an enable clock buffer, and the circuit modification section connects an observation FF to input terminals other than those for a test mode signal in the enable signal generation circuit.

In the failure detection improvement apparatus according to the present invention, the circuit whose output value is fixed by a test mode signal is a selector to which the test mode signal is input as a select signal, and the circuit modification section connects an observation FF to the input terminal of the selector.

In the failure detection improvement apparatus according to the present invention, the circuit modification section extracts a circuit in which the number of logic stages exceeds the upper limits of the ATPG tool based on a failure list that the ATPG tool outputs and inserts a circuit including the observation FF at an observation point that divides the number of logic stages in half.

In the failure detection improvement apparatus according to the present invention, the circuit modification section performs timing verification for the net list using a timing verification tool, selects a circuit including the observation FF from a plurality of choices based on a result of the timing verification and inserts the selected circuit at the observation point.

According to a second aspect of the present invention, there is provided a medium being readable by a computer and having a failure detection improvement program allowing a computer to execute a failure detection improvement method that modifies a net list recorded thereon, the program allowing the computer to execute: a net list input step that inputs the net list; a circuit modification step that adds an observation FF to an appropriate location on the net list; and a net list output step that outputs the net list that has been modified in the circuit modification step.

In the medium according to the present invention, the appropriate location is a circuit whose output value is fixed by a test mode signal.

In the medium according to the present invention, the appropriate location is a circuit in which the number of logic stages exceeds the upper limit of an ATPG tool.

In the medium according to the present invention, the circuit whose output value is fixed by a test mode signal is a circuit for generating an enable signal of an enable clock buffer, and the circuit modification step connects an observation FF to input terminals other than those for a test mode signal in the enable signal generation circuit.

In the medium according to the present invention, the circuit whose output value is fixed by a test mode signal is a selector to which the test mode signal is input as a select signal, and the circuit modification step connects an observation FF to the input terminal of the selector.

In the medium according to the present invention, the circuit modification step extracts a circuit in which the number of logic stages exceeds the upper limits of the ATPG tool based on a failure list that the ATPG tool outputs and inserts a circuit including the observation FF at an observation point that divides the number of logic stages in half.

In the medium according to the present invention, the circuit modification step performs timing verification for the net list using a timing verification tool, selects a circuit including the observation FF from a plurality of choices based on a result of the timing verification and inserts the selected circuit at the observation point.

According to a third aspect of the present invention, there is provided a failure detection improvement method that modifies a net list, comprising: a net list input step that inputs the net list; a circuit modification step that adds an observation FF to an appropriate location on the net list; and a net list output step that outputs the net list that has been modified in the circuit modification step.

The present invention automatically finds the circuit fixed by a test mode signal and adds the observation FF, thereby modifying the circuit into one that can detect a failure. Further, the present invention automatically checks the circuit with deep logic and adds the observation FF, thereby modifying the circuit into one that can detect a failure. Further, the utilization of the timing verification result makes it possible to modify the circuit with strict timing restriction into an adequate one. Even a user without special technical knowledge can achieve the improvement of the failure detection rate.

DETAILED DESCRIPTION OF THE PREFERRED EMBODIMENTS

An embodiment of the present invention will be described below with reference to the accompanying drawings.

Firstly, a configuration of a circuit verification system including a failure detection improvement apparatus according to the present invention will be described.

Figure 1:
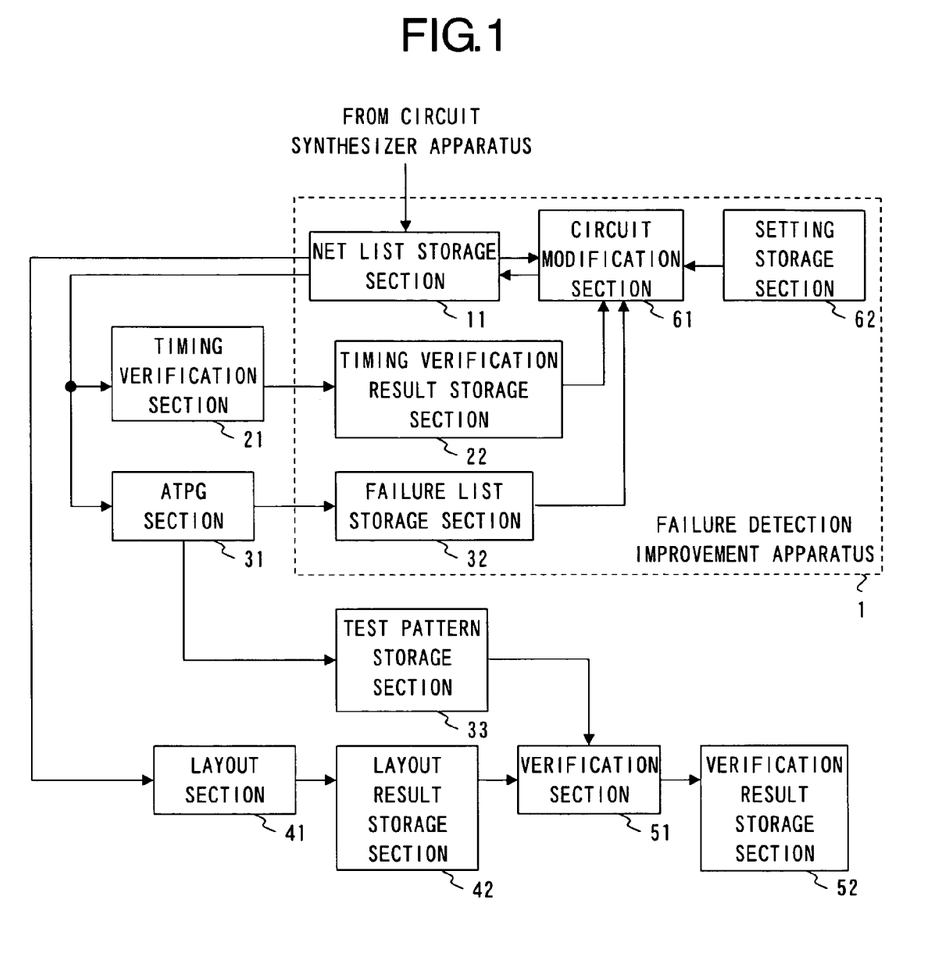
FIG. 1 is a block diagram showing an example of a configuration of a circuit verification system according to the present invention.

FIG. 1 is a block diagram showing an example of a configuration of a circuit verification system according to the present invention. The circuit verification system includes a failure detection improvement apparatus 1, a timing verification section 21, an ATPG section 31, a test pattern storage section 33, a layout section 41, a layout result storage section 42, a verification section 51, and a verification result storage section 52. The failure detection improvement apparatus 1 includes a net list storage section 11, a timing verification result storage section 22, a failure list storage section 32, a circuit modification section 61, and a setting storage section 62.

Next, an operation of the circuit verification system including the failure detection improvement apparatus according to the present invention will be described.

A net list generated by an external circuit synthesizer apparatus is stored in the net list storage section 11. The timing verification section 21 performs timing verification of the net list and stores a timing verification result in the timing verification result storage section 22. The ATPG section 31 generates a failure list and test pattern from the net list and stores the failure list and test pattern in the failure list storage section 32 and test pattern storage section 33, respectively.

A setting file of the circuit modification section 61 is previously stored in the setting storage section 62. The setting file includes a naming rule for specifying the name of a cell or signal, such as scan clock signal name, test mode signal name, cell name of mask cell or GCKB, cell name of FF to be inserted by a circuit modification process, or the type of the above components. The circuit modification section 61 uses the net list, failure list, and setting file to perform a circuit modification and stores a net list after modification in the net list storage section 11. In the case where failure detection rate can be increased, the circuit modification process may be repeated.

The layout section 41 performs a layout of the net list after modification and stores a layout result in the layout result storage section 42. The ATPG section 31 again generates a failure list and test pattern from the net list after modification and stores the failure list and test pattern in the failure list storage section 32 and test pattern storage section 33, respectively. The verification section 51 performs verification based on the layout result and test pattern and stores a verification result in the verification result storage section 52.

A description will be given of the failure list which is output from the ATPG section 31. The ATPG section 31 performs failure simulation for detecting a failure location and outputs the failure list as a result of the failure simulation. The failure list describes an equivalent failure flag, failure flag, failure type, connected unique name, pin name, detail flag, and the like. The detail flag describes a detail of the failure in a classified manner (circuit fixed by a test mode signal, circuit with deep logic, and the like).

Next, an operation of the failure detection improvement apparatus 1 will be described.

The failure detection improvement apparatus 1 performs a circuit modification process for the circuit fixed by a test mode signal or the circuit with deep logic. The circuit fixed by a test mode signal includes the mask cell and selector, as described above.

Figure 2:
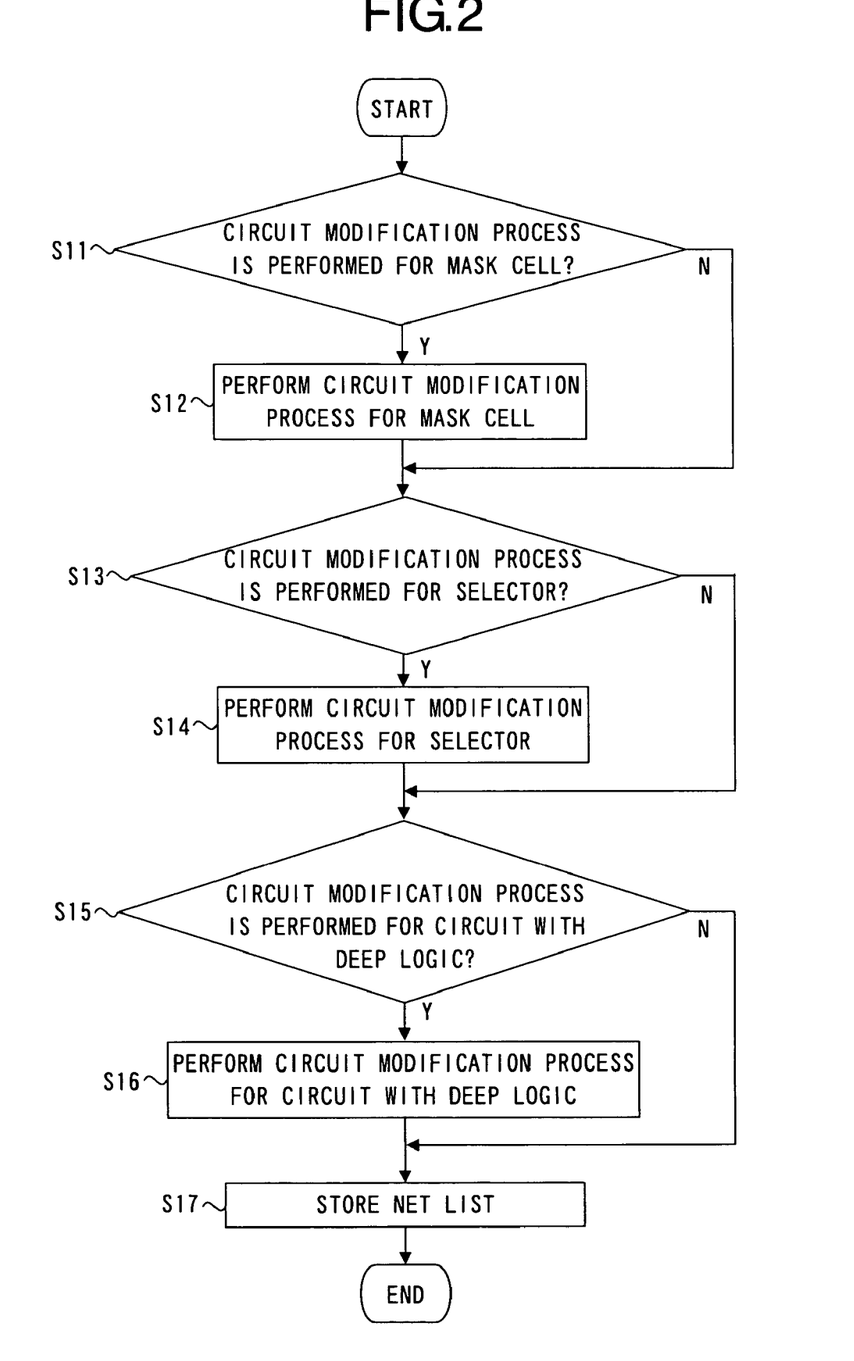
FIG. 2 is a flowchart showing an example of an operation of a failure detection improvement apparatus according to the present invention.

FIG. 2 is a flowchart showing an example of an operation of the failure detection improvement apparatus according to the present invention. Firstly, the circuit modification section 61 determines whether to perform a circuit modification process for the mask cell depending on an instruction from a user that has viewed the failure list (S11). When determining not to perform the circuit modification process (No in S11), the circuit modification section 61 shifts to process S13. When determining to perform the circuit modification process (Yes in S11), the circuit modification section 61 performs the circuit modification process for the mask cell (S12) and shifts to process S13. Secondly, the circuit modification section 61 determines whether to perform the circuit modification process for the selector depending on an instruction from a user that has viewed the failure list (S13). When determining not to perform the circuit modification process (No in S13), the circuit modification section 61 shifts to process S15. When determining to perform the circuit modification process (Yes in S13), the circuit modification section 61 performs the circuit modification process for the selector (S14) and shifts to process S15. Thirdly, the circuit modification section 61 determines whether to perform the circuit modification process for the circuit with deep logic depending on an instruction from a user that has viewed the failure list (S15). When determining not to perform the circuit modification process (No in S15), the circuit modification section 61 shifts to process S17. When determining to perform the circuit modification process (Yes in S15), the circuit modification section 61 performs the circuit modification process for the circuit with deep logic (S16) and shifts to process S17.

Finally, the circuit modification section 61 stores, as a net list, the modified circuit in the net list storage section 11 (S17) and ends this flow.

Next, the circuit modification processes for the mask cell and selector will be described as a first circuit modification process.

Figure 3:
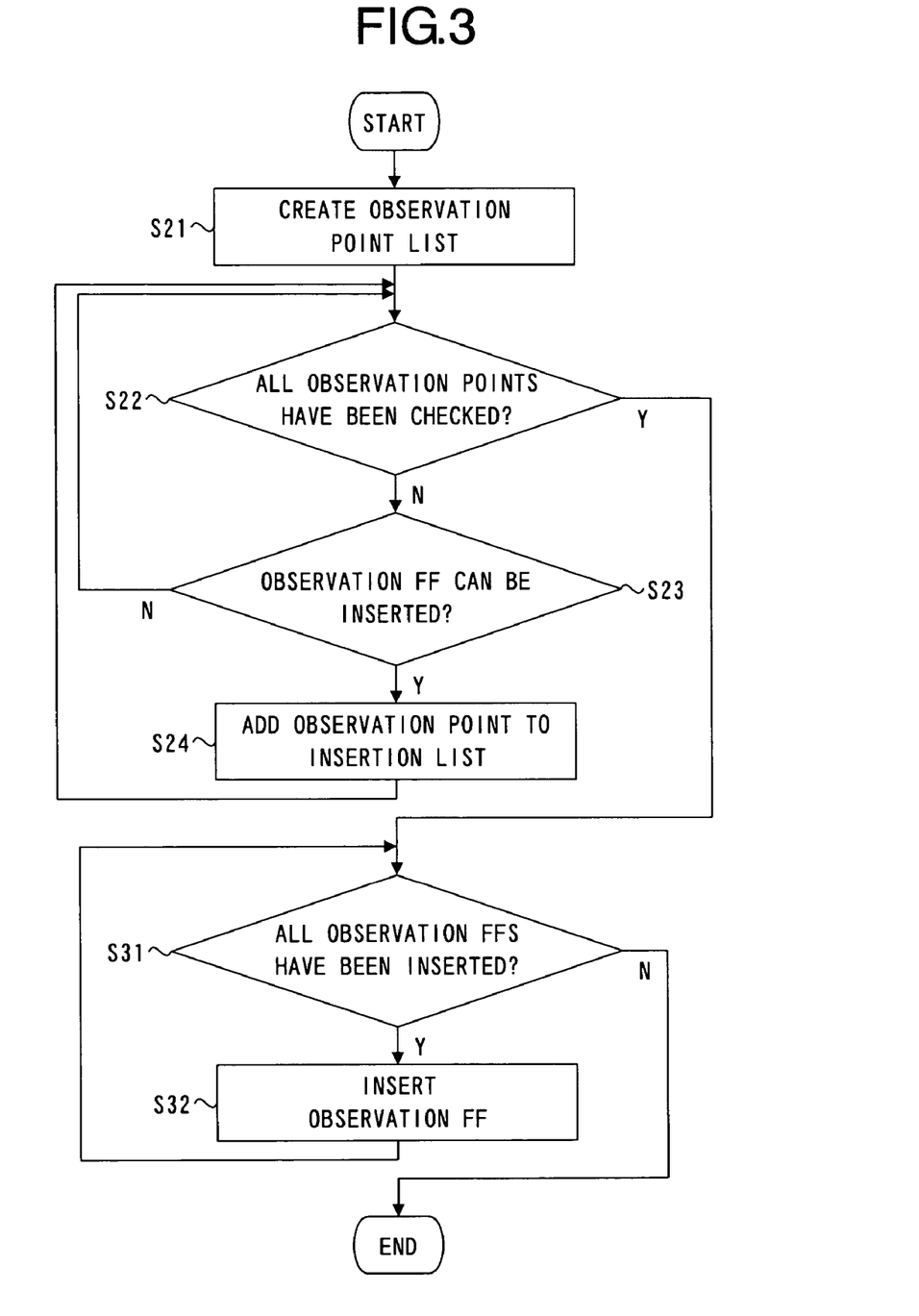
FIG. 3 is a flowchart showing an example of a first circuit modification operation in the failure detection improvement apparatus according to the present invention.

FIG. 3 is a flowchart showing an example of the first circuit modification operation in the failure detection improvement apparatus according to the present invention. Firstly, the circuit modification section 61 extracts a circuit to be modified from the net list in the net list storage section 61 according to the setting file stored in the setting storage section 62 and creates an observation point list indicating the observation points in the circuit to be modified (S21).

Figure 4:
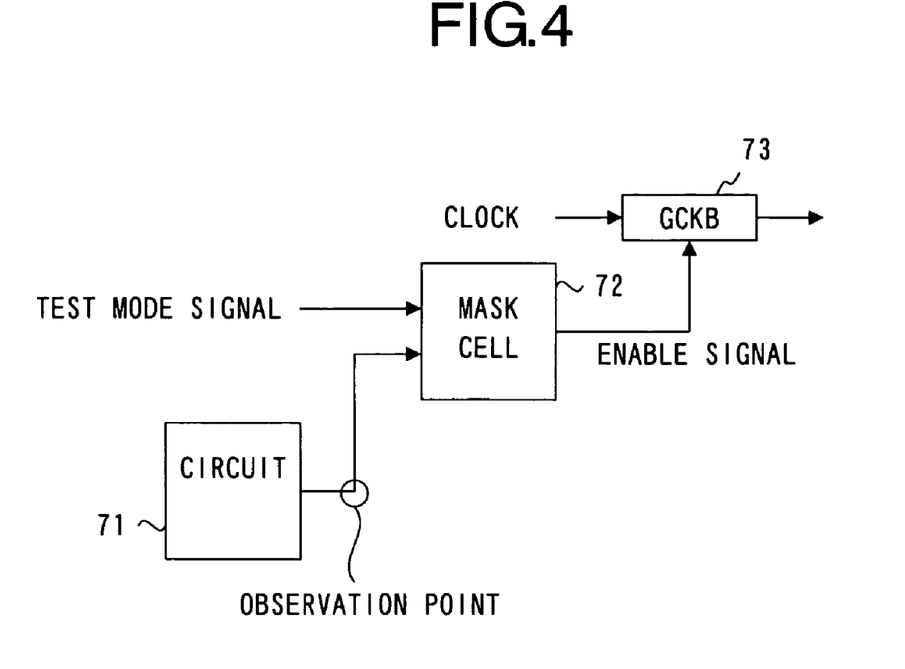
FIG. 4 is a circuit diagram showing an example of an observation point according to the present invention in the case where a circuit to be modified is a mask cell.

In the case where the circuit to be modified is the mask cell, one of the methods available for extracting the observation points is as follows: a test mode signal and a GCKB enable terminal are firstly extracted from the setting file; and, on the net list, a circuit to which the test mode signal is input and which has the enable terminal of GCKB as the output thereof is set as the mask cell, and another input terminal of the mask cell is set as observation point. FIG. 4 is a circuit diagram showing an example of the observation point according to the present invention in the case where a circuit to be modified is a mask cell. This circuit includes a circuit 71, a mask cell 72, and a GCKB 73. The observation point is an output of the circuit 71 and an input of the mask cell 72.

Figure 5:
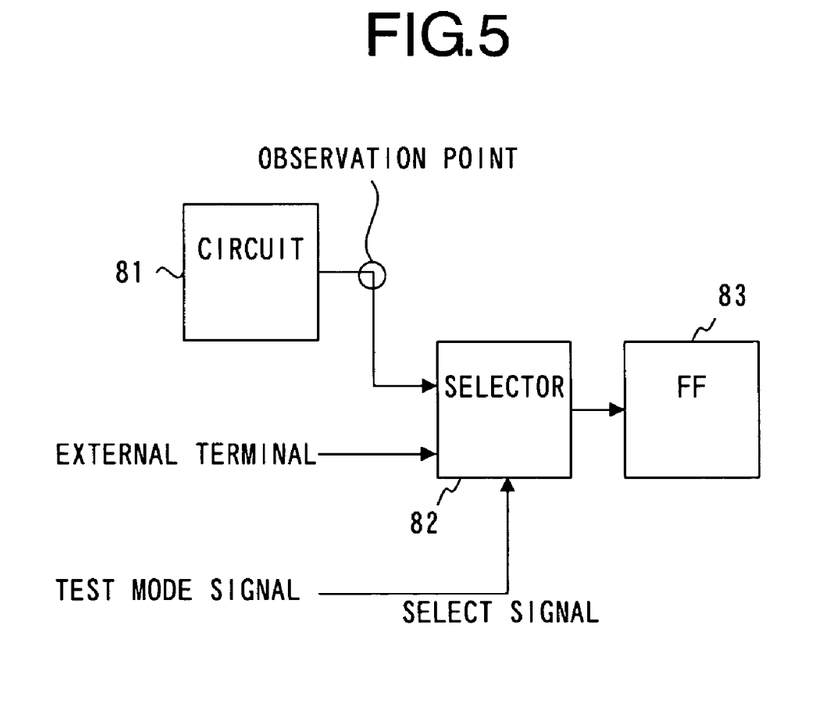
FIG. 5 is a circuit diagram showing an example of an observation point according to the present invention in the case where a circuit to be modified is a selector.

In the case where the circuit to be modified is the selector, one of the methods available for extracting the observation points is as follows: a test mode signal and Set/Reset terminal of the selector are extracted from the setting file; and the Set/Reset terminal of the selector to which a selector signal is input as a test mode signal is extracted from the net list as the observation point. FIG. 5 is a circuit diagram showing an example of the observation point according to the present invention in the case where a circuit to be modified is a selector. This circuit includes a circuit 81, a selector 82, and an FF 83. The observation point is an output of the circuit 81 and an input of the selector 82.

Then, the circuit modification section 61 determines whether all observation points in the observation point list have been checked (S22). When determining that the checks of all observation points have been completed (Yes in S22), the circuit modification section 61 shifts to process S31. When determining that the checks of all observation points have not been completed (No in S22), the circuit modification section 61 sequentially selects and checks the observation points in the observation point list and determines whether an observation FF can be inserted at the selected observation point (S23). When determining that the observation FF cannot be inserted (No in S23), the circuit modification section 61 returns to process S22. When determining that the observation FF can be inserted (Yes in S23), the circuit modification section 61 adds the selected observation point to an insertion list (S24) and returns to process S22.

Figure 6:
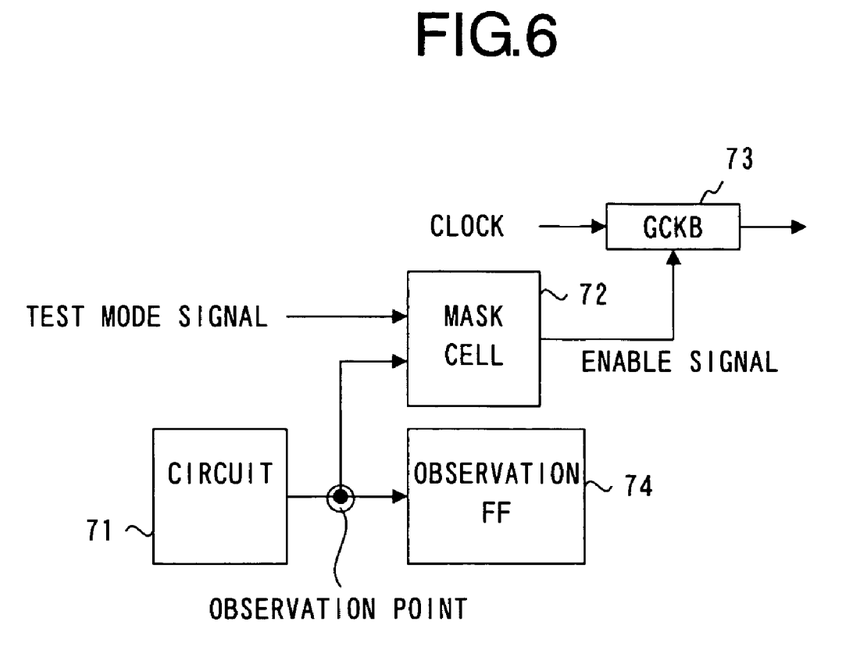
FIG. 6 is a circuit diagram showing an example of a circuit after modification according to the present invention in the case where a circuit to be modified is a mask cell.
Figure 7:
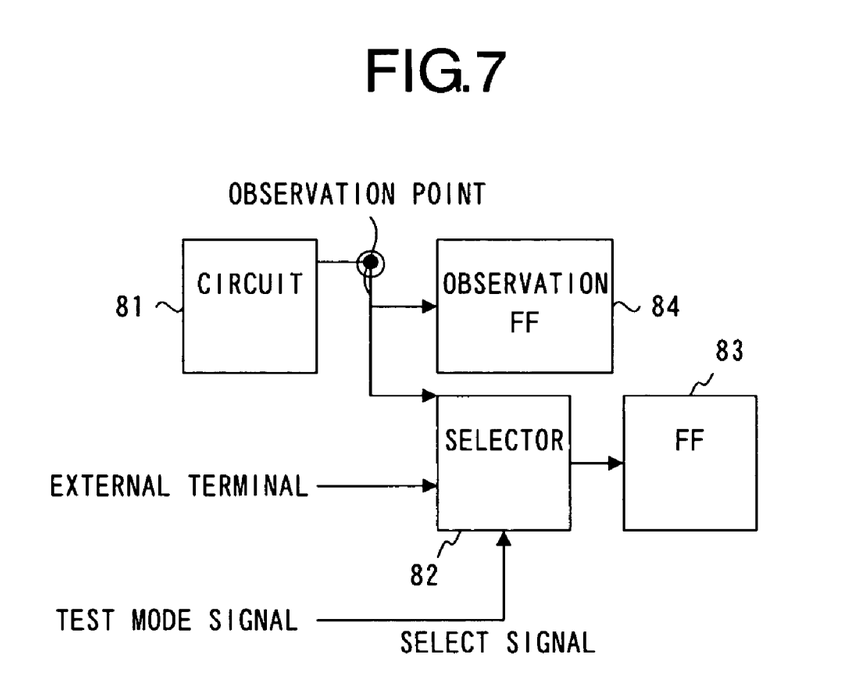
FIG. 7 is a circuit diagram showing an example of a circuit after modification according to the present invention in the case where a circuit to be modified is a selector.

Then, the circuit modification section 61 determines whether all observation FFs in the insertion list have been inserted (S31). When determining that the insertions of all observation FFs have been completed (Yes in S31), the circuit modification section 61 ends this flow. When determining that the insertions of all observation FFs have not been completed (No in S31), the circuit modification section 61 sequentially selects the observation points in the insertion list and inserts the observation FF at the selected observation point (S32) and returns to process S31. Note that a scan clock signal is connected to the clock terminal of the observation FF. FIG. 6 is a circuit diagram showing an example of a circuit after modification according to the present invention in the case where a circuit to be modified is a mask cell. In FIG. 6, the same reference numerals denote the same or corresponding parts as in FIG. 4, and the descriptions thereof will be omitted. FIG. 6 differs from FIG. 4 in that an observation FF 74 has been inserted at the observation point. FIG. 7 is a circuit diagram showing an example of a circuit after modification according to the present invention in the case where a circuit to be modified is a selector. In FIG. 7, the same reference numerals denote the same or corresponding parts as in FIG. 5, and the descriptions thereof will be omitted. FIG. 7 differs from FIG. 5 in that an observation FF 84 has been inserted at the observation point.

According to the above first circuit modification process, it is possible to increase the failure detection rate by inserting the observation FF into the circuit fixed by a test mode signal.

Next, the circuit modification processes for the circuit with deep logic will be described as a second circuit modification process.

Figure 8:
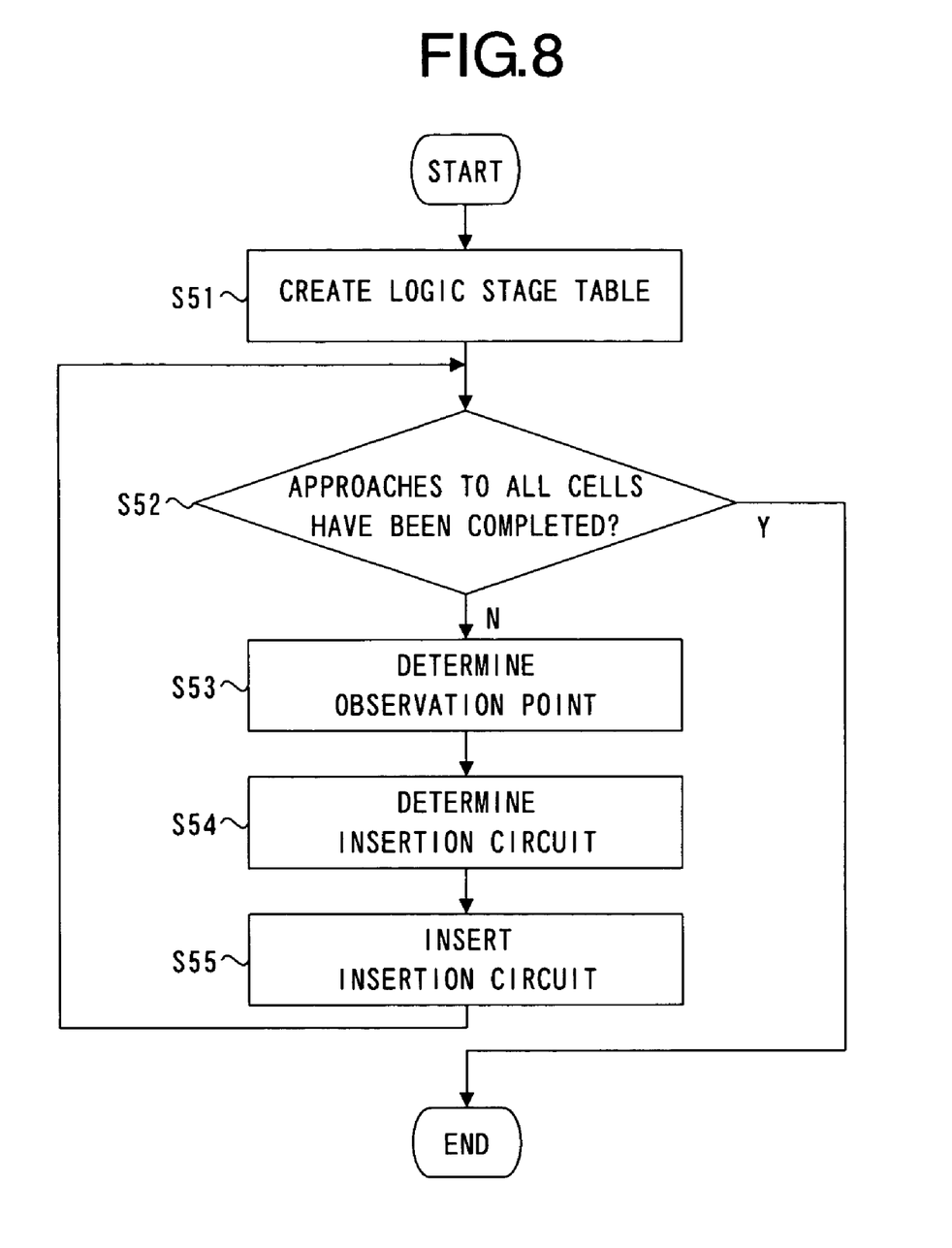
FIG. 8 is a flowchart showing an example of a second circuit modification operation in the failure detection improvement apparatus according to the present invention.

FIG. 8 is a flowchart showing an example of the second circuit modification operation in the failure detection improvement apparatus according to the present invention. Firstly, the circuit modification section 61 counts the number of logic stages from the cell that the failure list stored in the failure list storage section 32 shows as a circuit with deep logic to the FF as a source and creates a logic stage table including a result of the count (S51). The logic stage table represents a cell name, the minimum and maximum numbers of logic stages up to the FF as a source for each cell of the circuit with deep logic.

Then the circuit modification section 61 determines whether approaches to all cells in the logic stage table have been completed (S52). When determining that the approaches to all cells have been completed (Yes in S52), the circuit modification section 61 ends this flow. When determining that the approaches to all cells have not been completed (No in S52), the circuit modification section 61 sequentially selects the cells in the logic stage table and determines the observation point based on the number of logic stages in the logic stage table (S53). The observation point is set, for example, to the point that divides the maximum number of logic stages in half. Alternatively, a user may determine the observation point with reference to the logic stage table.

Figure 9:
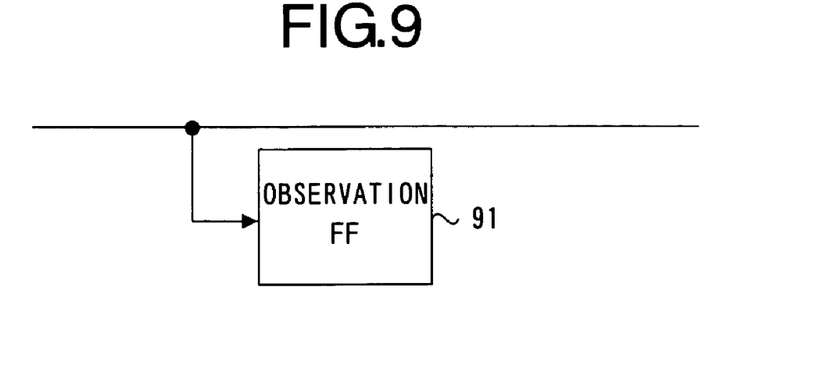
FIG. 9 is a circuit configuration showing an example of a first insertion circuit according to the present invention.
Figure 10:
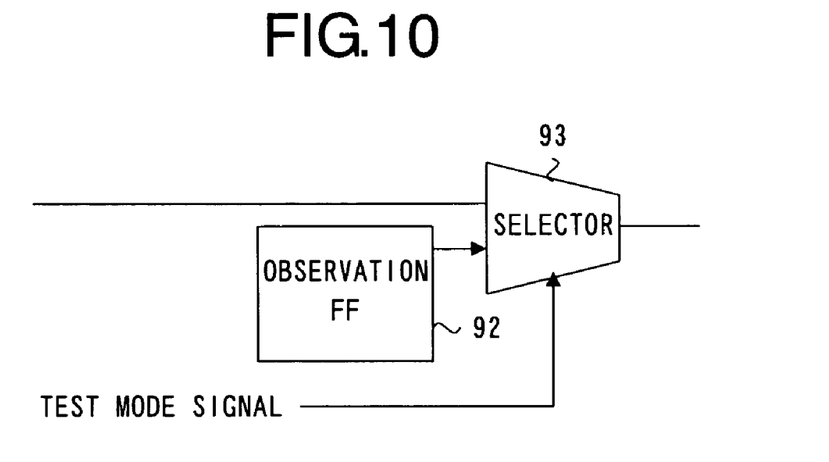
FIG. 10 is a circuit configuration showing an example of a second insertion circuit according to the present invention.
Figure 11:
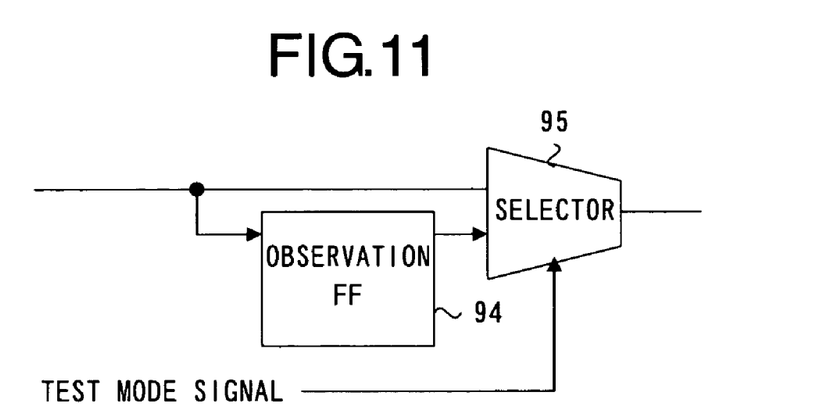
FIG. 11 is a circuit configuration showing an example of a third insertion circuit according to the present invention.

Then the circuit modification section 61 determines a circuit to be inserted at the selected observation point based on the timing verification result stored in the timing verification result storage section 22 (S54). Examples of the circuit to be inserted include the following three types of insertion circuits. FIG. 9 is a circuit configuration showing an example of a first insertion circuit according to the present invention. The circuit of FIG. 9 includes an observation FF 91. FIG. 10 is a circuit configuration showing an example of a second insertion circuit according to the present invention. The circuit of FIG. 10 includes an observation FF 92 and selector 93. FIG. 11 is a circuit configuration showing an example of a third insertion circuit according to the present invention. The circuit of FIG. 11 includes an observation FF 94 and a selector 95. When these three insertion circuits are compared in terms of improvement effect in the failure detection rate, they are arranged in the following increasing order: first insertion circuit, second insertion circuit, third insertion circuit. Further, in terms of influence of the timing, they are arranged in the following increasing order: first insertion circuit, second insertion circuit, third insertion circuit. Accordingly, the circuit modification section 61 selects the insertion circuit having smaller influence of the timing in the circuit verified as being with stricter timing restriction in the timing verification result; and, on the other hand, selects the insertion circuit having a larger improvement effect in the failure detection rate in the circuit verified as being with looser timing restriction in the timing verification result.

Then the circuit modification section 61 performs an insertion of the circuit selected as the observation point (S55) and returns to process S52.

After that, the timing verification section 21 performs timing verification using the net list obtained after the circuit modification process performed by the failure detection improvement apparatus 1. When the timing condition is not fulfilled, the failure detection improvement apparatus 1 performs a circuit modification process to change the current insertion circuit to the circuit having smaller influence of the timing.

According to the above second circuit modification process, it is possible to increase the failure detection rate by inserting the observation FF into the circuit with deep logic.

Further, a program allowing a computer constituting the failure detection improvement apparatus to execute the abovementioned respective steps can be provided as a failure detection improvement program. When the above-described program is stored in a computer-readable storage medium, the computer constituting the failure detection improvement apparatus can execute the program. The computer-readable storage medium mentioned here includes: an internal storage device mounted inside the computer, such as ROM or RAM; portable storage medium such as a CD-ROM, a flexible disk, a DVD disk, a magneto-optical disk, or an IC card; a database that holds computer program; another computer and database thereof; and a transmission medium on a network line.

Note that a net list input section and net list output section correspond to the net list storage section mentioned in the embodiment.

What is claimed is:

1. A failure detection improvement apparatus that modifies a net list, comprising;
   a net list input section to which the net list is input;
   a circuit modification section that adds an observation flip-flop to an appropriate location on the net list; and
   a net list output section that outputs the modified net list that has been modified by the circuit modification section;
   wherein the appropriate location is a circuit whose output value is fixed by a test mode signal, and
   the circuit whose output value is fixed by a test mode signal is a selector to which the test mode signal is input as a select signal, and
   the circuit modification section connects an observation flip-flop to the input terminal of the selector.

2. A medium being readable by a computer and having a failure detection improvement program allowing a computer to execute a failure detection improvement method that modifies a net list recorded thereon, the program allowing the computer to execute:
   a net list input step that inputs the net list;
   a circuit modification step that adds an observation flip-flop to an appropriate location on the net list; and
   a net list output step that outputs the modified net list that has been modified in the circuit modification step;
   wherein the appropriate location is a circuit whose output value is fixed by a test mode signal, and
   the circuit whose output value is fixed by a test mode signal is a selector to which the test mode signal is input as a select signal, and
   the circuit modification step connects an observation flip-flop to the input terminal of the selector.

3. A failure detection improvement method that modifies a net list, comprising:
   a net list input step that inputs the net list;
   a circuit modification step that adds an observation flip-flop to an appropriate location on the net list; and
   a net list output step that outputs the modified net list that has been modified in the circuit modification step;
   wherein the appropriate location is a circuit whose output value is fixed by a test mode signal, and
   the circuit whose output value is fixed by a test mode signal is a selector to which the test mode signal is input as a select signal, and
   the circuit modification step connects an observation flip-flop to the input terminal of the selector.

* * * * *